United States Patent
Sutoris et al.

(10) Patent No.: US 6,908,956 B2
(45) Date of Patent: Jun. 21, 2005

(54) STABILIZER COMPOSITION

(75) Inventors: Heinz Friedrich Sutoris, Worms (DE);
Sylke Haremza, Neckargemund (DE);
Hubert Trauth, Dudenhofen (DE);
Erik Hofmann, Hessheim (DE);
Manfred Appel, Landau (DE)

(73) Assignee: Basf Aktiengesellschaft, Ludwigshafen (DE)

( * ) Notice: Subject to any disclaimer, the term of this patent is extended or adjusted under 35 U.S.C. 154(b) by 67 days.

(21) Appl. No.: 10/181,439

(22) PCT Filed: Jan. 31, 2001

(86) PCT No.: PCT/EP01/01012

§ 371 (c)(1),
(2), (4) Date: Jul. 25, 2002

(87) PCT Pub. No.: WO01/57122

PCT Pub. Date: Aug. 9, 2001

(65) Prior Publication Data

US 2003/0060544 A1 Mar. 27, 2003

(30) Foreign Application Priority Data

Feb. 1, 2000 (DE) .......................... 100 04 158

(51) Int. Cl.$^7$ .................. C08K 5/357; C08K 5/3492; C08K 5/3477; C08K 5/3462; C08K 5/3415; C08K 5/3435

(52) U.S. Cl. .............. 524/89; 524/97; 524/99; 524/100; 524/102; 524/103; 252/400.31; 252/400.53

(58) Field of Search .................. 524/89, 97, 99.1, 524/102, 103; 252/400.31, 400.53

(56) References Cited

U.S. PATENT DOCUMENTS

| | | | | |
|---|---|---|---|---|
| 3,640,928 A | * | 2/1972 | Murayama et al. | 524/99 |
| 4,812,500 A | * | 3/1989 | Hayden | 524/99 |
| 4,976,889 A | | 12/1990 | Aumueller et al. | |
| 5,210,119 A | * | 5/1993 | Claesen et al. | 524/99 |
| 5,466,803 A | | 11/1995 | Borzatta | |
| 6,015,849 A | | 1/2000 | Gugumus | |
| 6,200,460 B1 | * | 3/2001 | Sutoris et al. | 208/48 AA |

FOREIGN PATENT DOCUMENTS

| | | | |
|---|---|---|---|
| DE | 196 51 307 | | 6/1998 |
| EP | 0304180 | * | 2/1989 |
| EP | 0 911 362 | | 4/1999 |
| JP | 07 076639 | | 3/1995 |
| JP | 07-076639 | * | 3/1995 |

OTHER PUBLICATIONS

PAJ machine translation of JP 07–076639 (Mar. 20, 1995), Izumi et al.*

Derwent ACC No. 1991–104133, abstract for EP 0 421 933 A1 (Apr. 10, 1991).

"Taschenbuch der Kunststoff–Additive", Gächter unde Müller, 3$^{rd}$ Edition, 1989, pp. 197–198.

* cited by examiner

*Primary Examiner*—Matthew A. Thexton
(74) *Attorney, Agent, or Firm*—Oblon, Spivak, McClelland, Maier & Neustadt, P.C.

(57) ABSTRACT

A description is given of a stabilizer composition comprising
A) at least one nitrogen compound having a molecular weight of at least 150, selected from a secondary amine in which all substituents positioned α to the amine nitrogen atom are different than hydrogen, or, derived from the secondary amine, a tertiary amine, hydroxylamine, alkoxyamine or amide; and
B) at least one iron compound. The stabilizer composition optionally comprises nitroxyl radicals. It is suitable for stabilizing nonliving organic material, especially polyolefins or homopolymers or copolymers of styrene, against the effects of light, heat or oxygen.

5 Claims, No Drawings

STABILIZER COMPOSITION

The present invention relates to a stabilizer composition and to its use to stabilize nonliving organic material against the effects of light, oxygen and heat.

The mechanical, chemical and/or esthetic properties of nonliving organic material, especially plastics and coating materials, are known to be impaired by the effects of light, oxygen and heat. This impairment is normally manifested as yellowing, discoloration, cracking or embrittlement of the material. The purpose of stabilizers or stabilizer compositions is to afford satisfactory protection to counter the deterioration of organic material as a result of light, oxygen and heat.

EP-A 0 723 990 discloses a synergistic stabilizer mixture which comprises, for example, the following components:

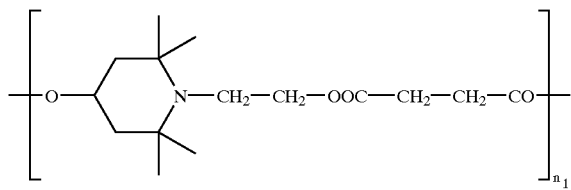

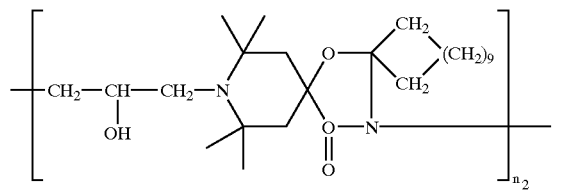

DE-A 44 04 144 discloses piperidine-triazine compounds of, for example, the formula below as light stabilizers, heat stabilizers and antioxidants for organic materials:

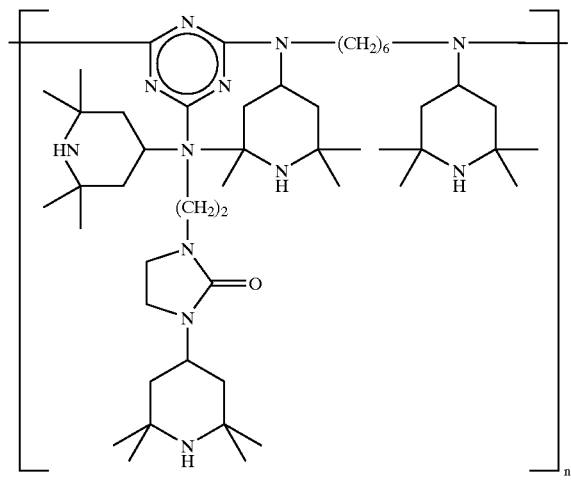

DE-A 37 38 736 discloses certain 4-formylaminopiperidine derivatives, e.g.:

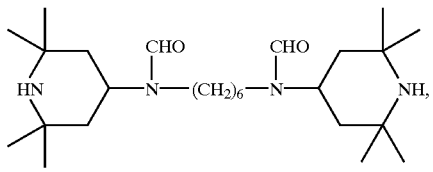

which have stabilizing properties in plastics.

Compounds of the abovementioned kind, having secondary amine functions in which all substituents positioned α to the amine nitrogen atom are different than hydrogen, are often termed sterically hindered amine stabilizers or HALS (Hindered Amine Light Stabilizers).

It has been found that a further improvement in the protective effect of the known stabilizers and stabilizer compositions is desirable.

It is an object of the present invention to specify a new stabilizer composition having a high protective action against the effects of light, oxygen and heat.

We have found that this object is achieved in that the protective action of sterically hindered amine stabilizers can be increased considerably by the addition of small amounts of an iron compound.

The invention accordingly provides a stabilizer composition comprising:

A) at least one nitrogen compound having a molecular weight of at least 150, selected from a secondary amine in which all substituents positioned α to the amine nitrogen atom are different than hydrogen, or, derived from the secondary amine, a tertiary amine, hydroxylamine, alkoxyamine or amide; and B) at least one iron compound.

Component A) of the stabilizer composition of the invention suitably comprises secondary amines having one or more amine nitrogen atoms in the molecule, in which all substituents positioned α to the amine nitrogen atom(s) are different than hydrogen. The amine nitrogen atom is preferably part of a 5-or 6-membered saturated heterocyclic ring system, for example, of a piperidine or pyrrolidine ring, where the substituents positioned α to the amine nitrogen are, for example, $C_1$–$C_4$-alkyl groups, preferably methyl groups. The heterocyclic ring may contain a further heteroatom, such as nitrogen, oxygen or sulfur, this heteroatom not being adjacent to the amine nitrogen atom. Suitable examples include known HALS stabilizers, examples being those described in the patent applications cited at the outset and in the prior art cited therein.

Suitable alternative nitrogen compounds for use in accordance with the invention are tertiary amines, hydroxylamines, alkoxyamines or amides which are derived from the secondary amine identified above, i.e., in which the hydrogen atom on the amine nitrogen of the secondary amine has been replaced by an alkyl group, preferably a primary alkyl group, in particular a $C_1$–$C_8$-alkyl group, which may have 1, 2, 3 or 4 substituents selected from OH and CN, or by a hydroxyl, alkoxy, especially $C_1$–$C_8$-alkoxy, alkenyl, especially $C_3$–$C_6$-alkenyl, or acyl group, especially a $C_1$–$C_8$-acyl group.

The amine nitrogen atoms may be part of the main structure of a polymeric chain or may be part of a side group on a polymeric chain.

With a view to limiting its volatility, the nitrogen compound should have a molecular weight of at least 150, preferably at least 300, and in particular from 450 to 5000.

Preferred nitrogen compounds that are suitable as component A) of the stabilizer composition of the invention have the formula:

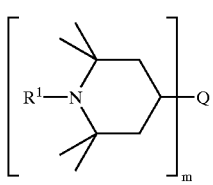
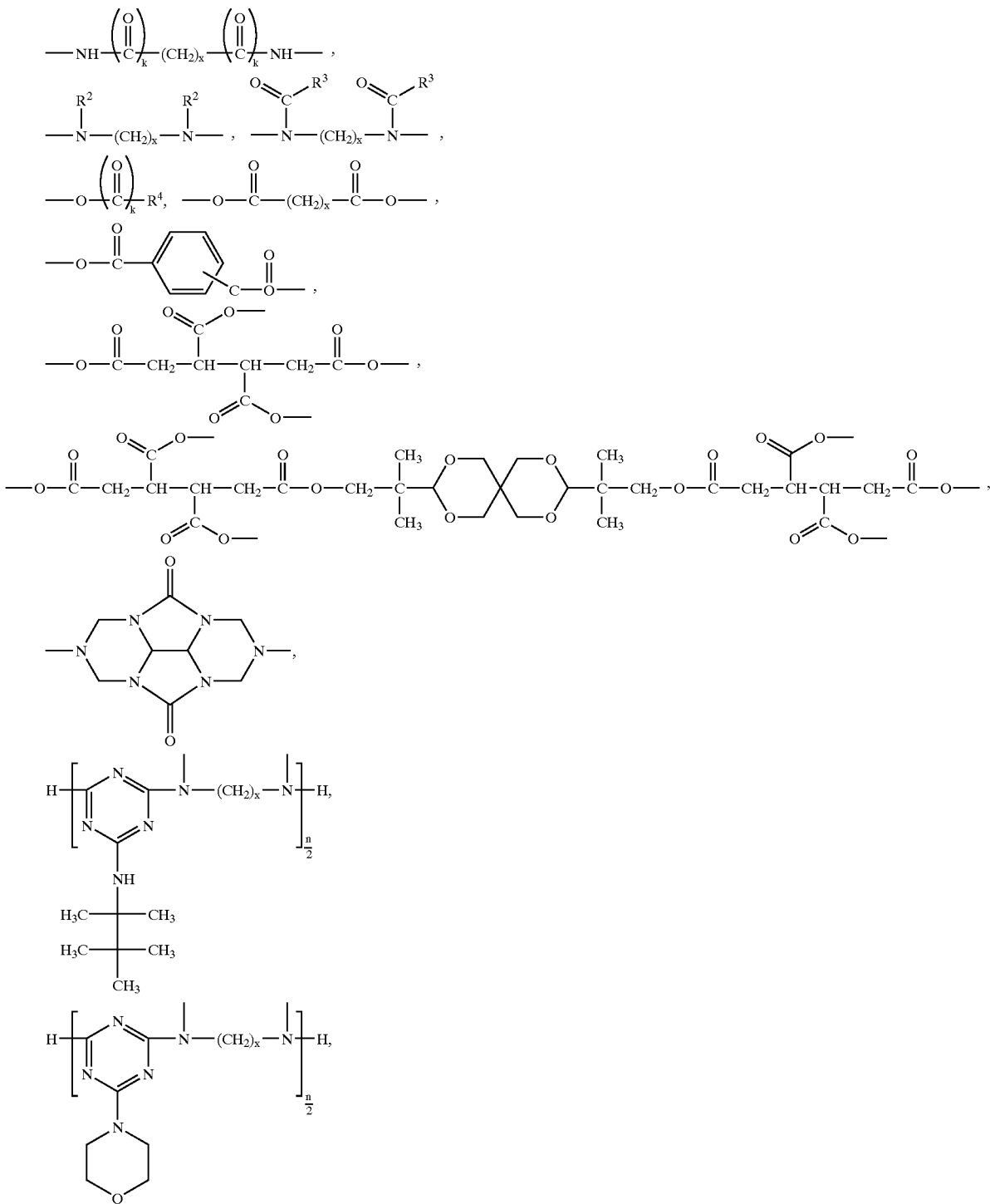
where
- $R^1$ is H, $C_1$–$C_8$-alkyl, $CH_2CN$, OH, $C_1$–$C_8$-alkoxy, $C_3$–$C_6$-alkenyl or $C_1$–$C_8$-acyl, preferably H,
- Q is an m-valent organic radical attached via O, N or C and having a molecular weight of $\geq 15$, preferably $\geq 30$, in particular from 45 to 5000, usually from 45 to 2000 or up to 400, and
- m is an integer from 1 to 100, preferably from 2 to 30.
In the above formula, Q is preferably selected from

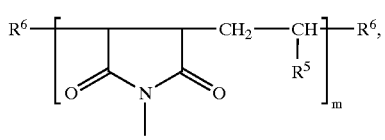

where
- $R^2$ is $C_1$–$C_{12}$-alkyl or —$(CH_2)_z$—$COOR^7$
- $R^3$ is hydrogen or $C_1$–$C_{18}$-alkyl,
- $R^4$ is $C_1$–$C_{18}$-alkyl, vinyl, isopropenyl or phenyl, which may carry one, two or three substituents selected from $C_1$–$C_4$-alkyl,
- $R^5$ is $C_8$–$C_{22}$-alkyl,
- $R^6$ is hydrogen or the residue of a free-radical polymerization initiator,
- $R^7$ is $C_1$–$C_{18}$-alkyl,
- k is 0 or 1,
- x and z independently of one another are from 1 to 12, and
- n is an even number m.

Particularly preferred secondary amines which are suitable as component A) of the stabilizer composition of the invention are the following:

2,2,6,6-tetramethylpiperidin-4-yl acetate,
2,2,6,6-tetramethylpiperidin-4-yl 2-ethylhexanoate,
2,2,6,6-tetramethylpiperidin-4-yl stearate,
2,2,6,6-tetramethylpiperidin-4-yl hexadecanoate,
2,2,6,6-tetramethylpiperidin-4-yl benzoate,
2,2,6,6-tetramethylpiperidin-4-yl (4-tert-butyl)benzoate,
bis(2,2,6,6-tetramethylpiperidin-4-yl) succinate,
bis(2,2,6,6-tetramethylpiperidin-4-yl) adipate,
bis(2,2,6,6-tetramethylpiperidin-4-yl) sebacate,
bis(2,2,6,6-tetramethylpiperidin-4-yl) phthalate,
bis(2,2,6,6-tetramethylpiperidin-4-yl) isophthalate,
bis(2,2,6,6-tetramethylpiperidin-4-yl) terephthalate,
N,N-bis(2,2,6,6-tetramethylpiperidin-4-yl)adipamide,
N,N-bis(2,2,6,6-tetramethylpiperidin-4-yl)-N,N-bisformyl-1,6-diaminohexane,
bis(1,2,2,6,6-pentamethylpiperidin-4-yl) sebacate,
bis(1-octyloxy-2,2,6,6-tetramethylpiperidin-4-yl) sebacate,
bis(1,2,2,6,6-pentamethylpiperidin-4-yl) n-butyl-3,5-di-tert-butyl-4-hydroxybenzylmalonate,
the condensate of 1-(2-hydroxyethyl)-2,2,6,6-tetramethyl-4-hydroxypiperidine and succinic acid,
the condensate of N,N'-bis(2,2,6,6-tetramethylpiperidin-4-yl)hexamethylenediamine and 4-tert-octylamino-2,6-dichloro-1,3,5-triazine,
tris(2,2,6,6-tetramethylpiperidin-4-yl) nitrilotriacetate,
tetrakis(2,2,6,6-tetramethylpiperidin-4-yl) 1,2,3,4-butanetetracarboxylate,
1,1'-(1,2-ethylene)bis(3,3,5,5-tetramethylpiperazinone),
bis(1,2,2,6,6-pentamethylpiperidin-4-yl) 2-n-butyl-2-(2-hydroxy-3,5-di-tert-butylbenzyl)malonate,
3-n-octyl-7,7,9,9-tetramethyl-1,3,8-triazaspiro[4.5]decane-2,4-dione,
bis(1-octyloxy-2,2,6,6-tetramethylpiperidin-4-yl) sebacate,
bis(1-octyloxy-2,2,6,6-tetramethylpiperidin-4-yl) succinate,
the condensate of N,N'-bis(2,2,6,6-tetramethylpiperidin-4-yl)hexamethylenediamine and 4-morpholino-2,6-dichloro-1,3,5-triazine,
the condensate of 2-chloro-4,6-bis(4-n-butylamino-2,2,6,6-tetramethylpiperidin-4-yl)-1,3,5-triazine and 1,2-bis(3-aminopropylamino)ethane,
the condensate of 2-chloro-4,6-di(4-n-butylamino-1,2,2,6,6-pentamethylpiperidin-4-yl)-1,3,5-triazine and 1,2-bis(3-aminopropylamino)ethane,
8-acetyl-3-dodecyl-7,7,9,9-tetramethyl-1,3,8-triazaspiro[4.5]-decane-2,4-dione,
3-dodecyl-1-(2,2,6,6-tetramethylpiperidin-4-yl)pyrrolidine-2,5-dione,
the condensate of N,N'-bis(2,2,6,6-tetramethylpiperidin-4-yl)hexamethylenediamine and 4-cyclohexylamino-2,6-dichloro-1,3,5-triazine,
4-butylamino-2,2,6,6-tetramethylpiperidine,
N-(2,2,6,6-tetramethylpiperidin-4-yl)-n-dodecylsuccinimide,
N-(1,2,2,6,6-pentamethylpiperidin-4-yl)-n-dodecylsuccinimide,
2-undecyl-7,7,9,9-tetramethyl-1-oxa-3,8-diaza-4-oxospiro[4.5]-decane,
the condensate of 7,7,9,9-tetramethyl-2-cycloundecyl-1-oxa-3,8-diaza-4-oxospiro-[4.5]decane and epichlorohydrin,
the condensates of 4-amino-2,2,6,6-tetramethylpiperidine with tetramethylolacetylenediureas and poly(methoxypropyl-3-oxy)[4-(2,2,6,6-tetramethyl)piperidinyl]-siloxane, and
alternating N-(2,2,6,6-tetramethyl-4-piperidinyl)maleimide-$C_{20}$–$C_{24}$ α-olefin copolymers. The latter are particularly preferred.

The iron compound suitable as component B) of the stabilizer composition of the invention is preferably selected from a) organometallic iron carbonyl compounds,
b) unsubstituted and substituted ferrocene compounds,
c) iron complexes with ligands in which the iron atom is bonded coordinatively by way of oxygen, nitrogen, sulfur and/or phosphorus,
d) iron halide and iron pseudohalide compounds.

Organometallic iron carbonyl compounds of group a) are, for example, compounds of the formula

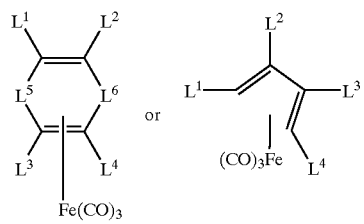

where
- $L^1$–$L^4$ are hydrogen or $C_1$–$C_4$-alkyls such as methyl, ethyl, propyl or t-butyl,
- $L^5$, $L^6$ are —$(CH_2)_n$— or —CO—, where n for the variables $L^5$ and $L^6$ independently of one another is 0, 1, 2 or 3.

Iron compounds that may be mentioned here by way of example are the following

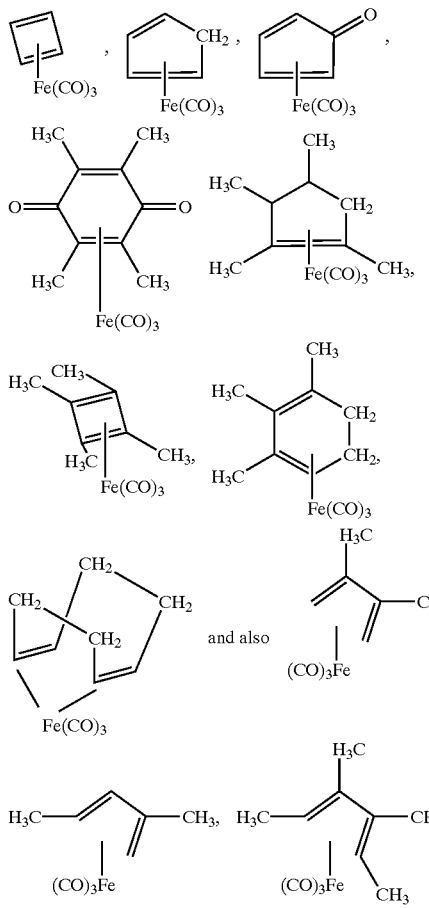

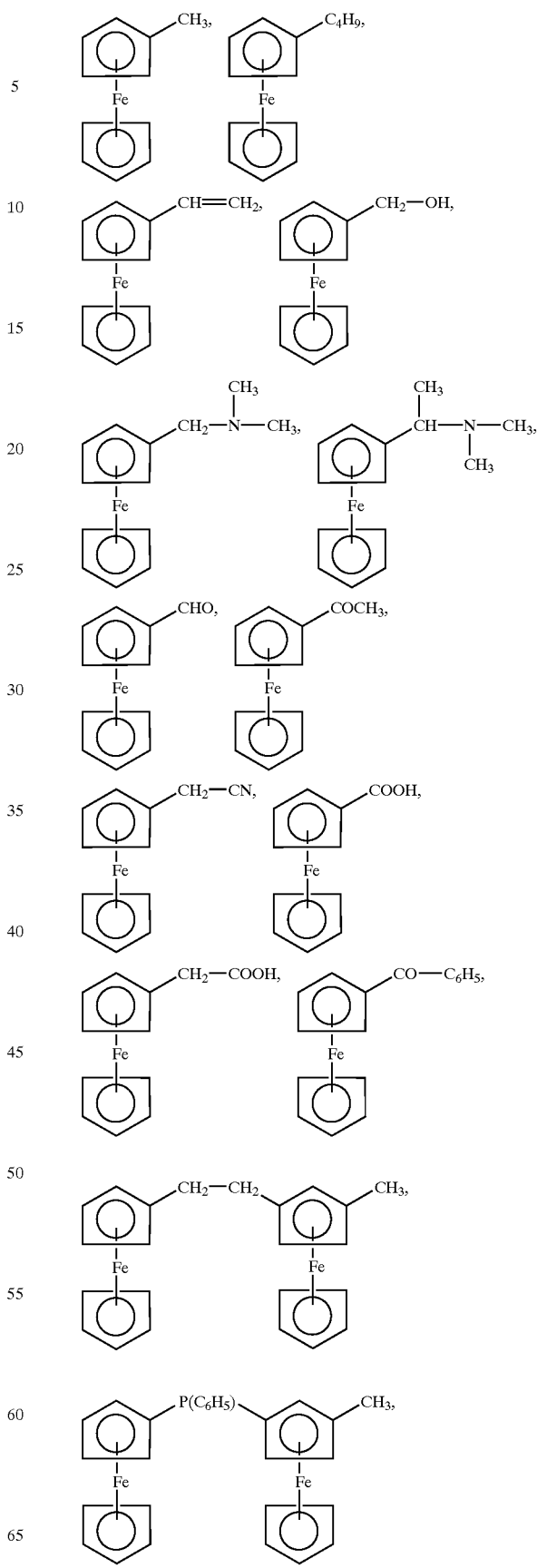

It is also possible from this group to make use in accordance with the invention of dinuclear iron compounds as well, such as $[H_5C_5Fe(CO)_2]_2$, $[(H_3C)_5C_5Fe(CO)_2]_2$ and the ferrates $M[Fe(CO)_2C_5H_5]$ and $M[Fe(CO)_2(H_3C)_5C_5]$ derived therefrom, where M is one equivalent of an alkali metal or alkaline earth metal, preferably sodium.

The compounds of group b) for use in accordance with the invention include ferrocene itself and also the derivatives substituted on one or both cyclopentadienyl rings. Furthermore, it is also possible to use dimeric ferrocene derivatives. The linking of the individual ferrocene units in this case is via one carbon atom of each cyclopentadienyl ring, via a chemical bond or via a methylene, ethylene, propylene, butylene or phenylphosphine bridge.

Suitable substituents of the cyclopentadienyl rings include $C_1$–$C_4$-alkenyl radicals, $C_7$–$C_{10}$-aroyl, $C_1$–$C_4$-alkyl radicals, such as methyl, ethyl, n-propyl, i-propyl, n-butyl, i-butyl, sec-butyl or t-butyl. Furthermore, one or two $CH_2$ or $CH_3$ groups in these substituents may be replaced by O, NH, $NCH_3$ or OH or $NH_2$. These heteroatoms or heteroatom-containing fragments are attached to carbon atoms. It is also possible for one or two $CH_2$ groups to be replaced by CO or for one or two $CH_3$ groups to be replaced by CN. Furthermore, instead of or in addition to the groups already mentioned, diphenylphosphine radicals may also act as substituents on the cyclopentadienyl rings.

Examples of ferrocene derivatives for use in accordance with the invention are

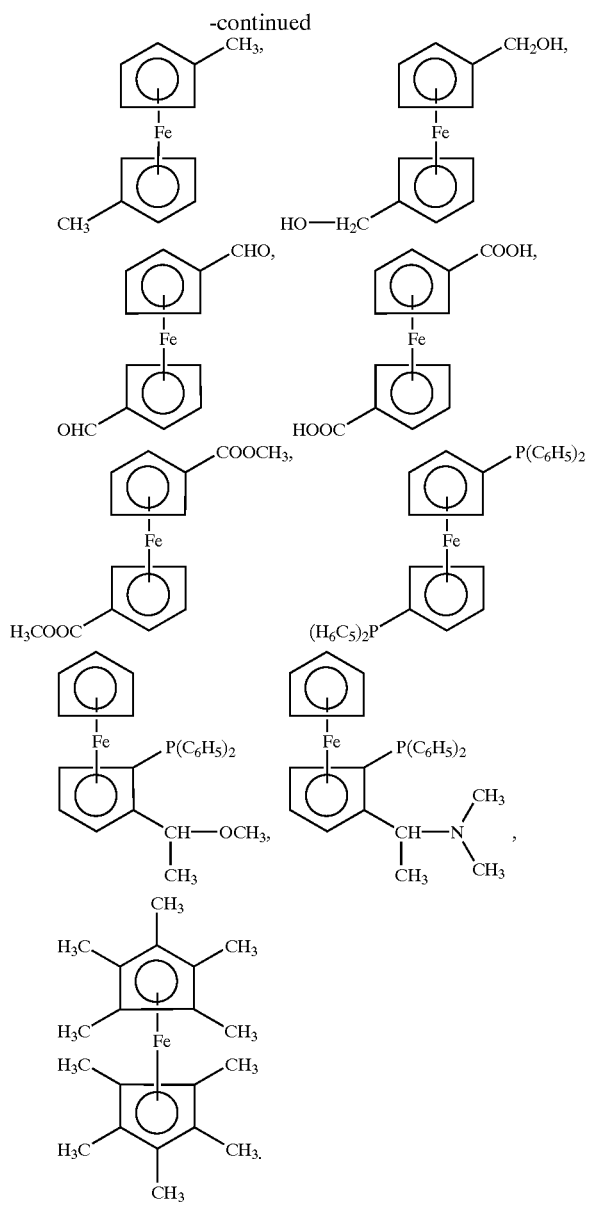

Group c) compounds used are iron complexes with ligands, preferably multidentate, e.g., bidentate, tridentate or tetradentate, ligands in which the iron atom is coordinatively bonded by way of oxygen, nitrogen, sulfur and/or phosphorus. They include complexes or salts of Fe(II)/Fe(III) with O-containing ligands, such as sulfate, acetate, oxalate, citrate, tartrate, lactate, gluconate or acetylacetonate (acac), i.e., compounds such as $[Fe_3O(SO_4)_6(OH)_3]^{5\ominus}$, $[Fe_3O(O_2CCH_3)_6(OH_2)_3]^{\oplus}$, $[Fe_3O(O_4C_2)_6(OH_2)_3]^{5\ominus}$, $[Fe(C_4H_4O_6)_2]^{2\ominus/\ominus}$, $Fe(C_4H_4O_6)$, $Fe_2(C_4H_4O_6)_3$, $Fe(C_3H_5O_3)_2$, $Fe(C_6H_{11}O_7)_2$, $[Fe(C_2O_4)_3]^{3\ominus}$, $FeC_2O_4$, $[Fe(C_2O_4)_2]^{2\ominus}$, $Fe(acac)_3$, $Fe(acac)_2$, $Fe(C_6H_6O_7)$, $Fe(C_6H_5O_7)$. Further exclusively or predominantly O-containing ligands for Fe(II) or Fe(III) may alternatively be multiple cyclic ethers, such as spherands, cryptands, cryptaspherands, hemispherands, coronands or open-chain representatives of these ethers, and podands. A description of such ligands which may be used together with Fe(II) or Fe(III) to prepare the iron compounds for use in accordance with the invention is given in the literature, e.g., C. J. Pedersen, H. K. Frensdorff, "Makrocyclische Polyether und ihre Komplexe" [Macrocyclic polyethers and their complexes], Angew. Chem. 84 (1) (1972) 16–26; G. Gokel, "Crown Ethers & Cryptands", Publ. by Roy. Soc. Chem., Black Bear Press Cambridge, England, 1991; D. J. Cram, "Präorganisation—von Solventien zu Sphäranden" [Preorganization—from solvents to spherands], Angew. Chem. 98 (1986) 1041–1060; Phase Transfer Catalysts, Merck-Schuchardt brochure; G. W. Gokel, S. H. Korzeniowski, "Macrocyclic Polyether Synthesis", Springer Verlag Berlin, Heidelberg, N.Y., pp. 55–151, 1982; U.S. Pat. No. 3,760,005; however, ligands containing arsenic ought not to be used.

It is further possible to use complexes with N-containing chelate ligands such as ethylenediamine (en), 1,10-phenanthroline (phen), 1,8-naphthpyridine (napy), 2,2'-bipyridin (pipy), and dibenzo[b,i]-1,4,8,11-tetraaza[14]annulene (taa), i.e., compounds such as $[Fe(en)(H_2O)_4]^{2\oplus/3\oplus}$, $[Fe(en)_2(H_2O)_2]^{2\oplus/3\oplus}$, $[Fe(en)_3]^{2\oplus/3\oplus}$, $[Fe(phen)_3]^{2\oplus/3\oplus}$, $[Fe(napy)_4]^{2\oplus/3\oplus}$, $[Fe(pipy)_4]^{2\oplus/3\oplus}$ and

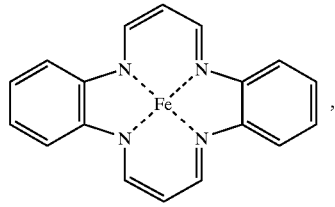

(Fe(taa))

and also complexes of iron with various substituted porphyrin ligands, as known from the literature (for example, B. Mennier, Chem. Rev., Vol 92 (8) (1992) 1411–1456). Other N-containing ligands that may be used are phthalocyanine and its derivatives. N,O-containing ligands, such as ethylenediaminetetraacetic acid (EDTA) or nitrilotriacetic acid (NTA), give rise to compounds such as $[Fe(EDTA)(H_2O)]^{\ominus/2\ominus}$, $[Fe(NTA)(H_2O)_2]$ and $[Fe(NTA)(H_2O)_2]^{\ominus}$;

with 8-hydroxyquinoline (quin) or 5-methyl-8-hydroxyquinoline ($H_3C$-quin) compounds such as $[Fe(quin)_3]/[Fe(quin)_3]^{2\ominus}$ and
$[Fe(H_3C\text{-}quin)_3]/[Fe(H_3C\text{-}quin)_3]^{2\ominus}$, which may likewise be used.

Further iron compounds with N,O-containing chelate ligands for use in accordance with the invention possess the following formulae:

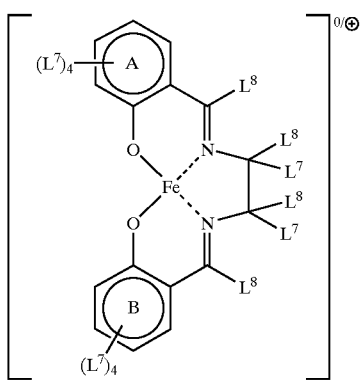

,

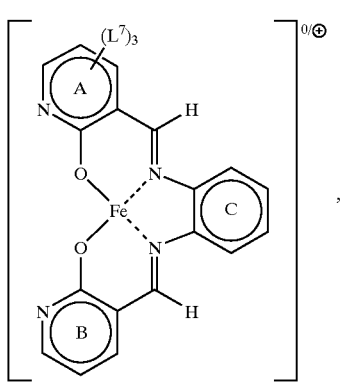

,

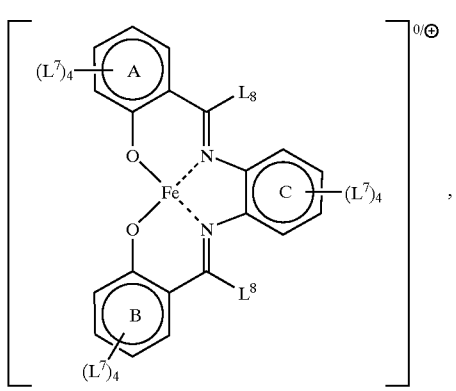

,

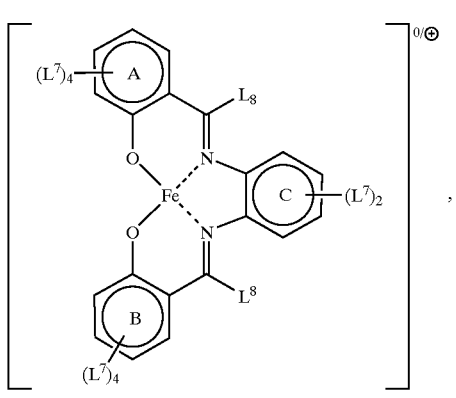

X = NH, O, S

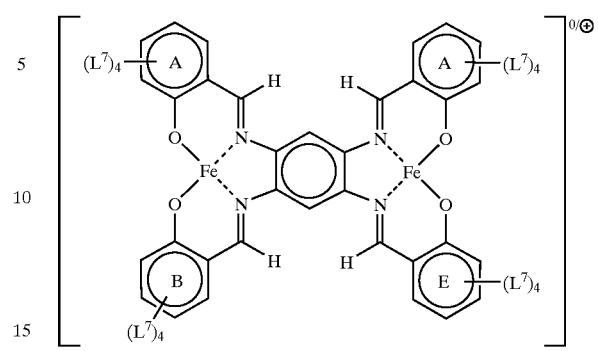

,

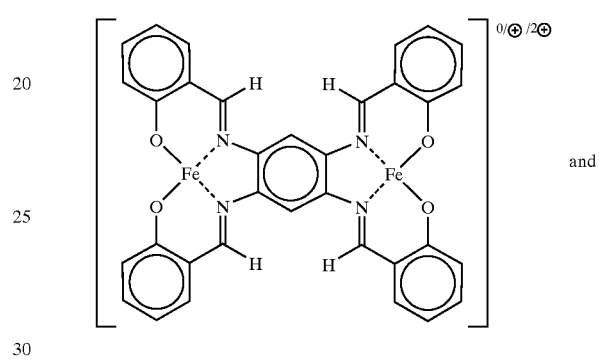

and

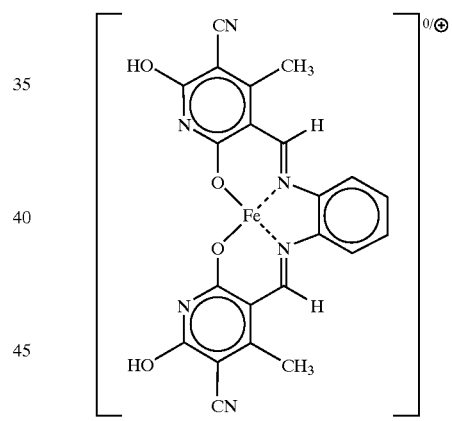

.

where the radicals $L^7$ are hydrogen, halogen, $SO_3H$, $SO_2NH_2$, $SO_2NH(C_1-C_{12}$-alkyl), $SO_2N(C_1-C_{12}$-alkyl)$_2$, $CONH_2$, $CONH(C_1-C_{12}$-alkyl), $CON(C_1-C_{12}$-alkyl)$_2$, cyano, hydroxyl, $C_1-C_{12}$-alkyl, $C_1-C_{12}$-alkoxy or $C_1-C_{12}$-alkylthio. Preferred halogens are Cl and Br. The radicals $L^8$ independently of one another are hydrogen, cyano, $C_1-C_{12}$-alkyl, $C_1-C_{12}$-alkoxy or halogen, Cl and Br being preferred. The aromatic or heteroaromatic rings A, B, C, D and E may, furthermore, be benzo-fused, in which case the radicals $L^7$ present in each case on the benzo-fused rings A, B, C are distributed over the remaining six positions. "0/⊕", for example, indicates the overall charge depending on whether Fe(II) or Fe(III) is present in the complex (i.e., 0 when Fe(II) is present, +1 ("⊕") when Fe(III) is present).

Examples of such iron compounds are

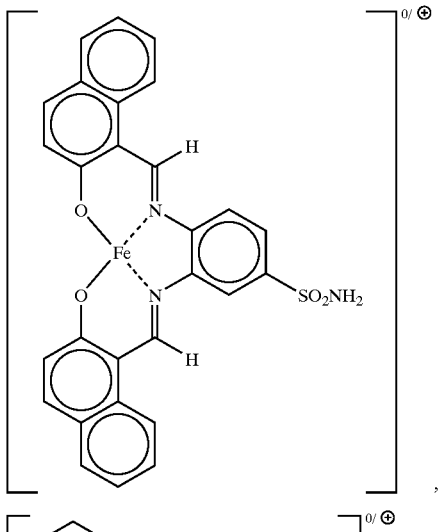,

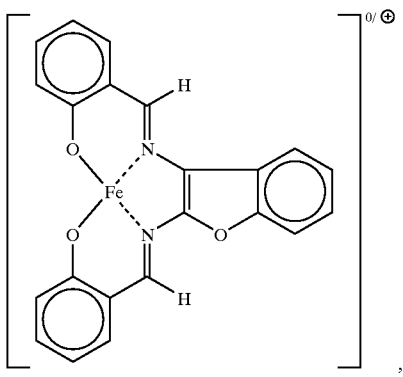,

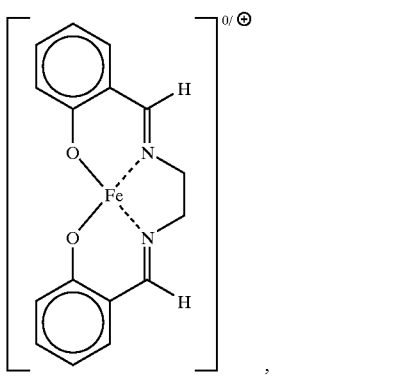, and 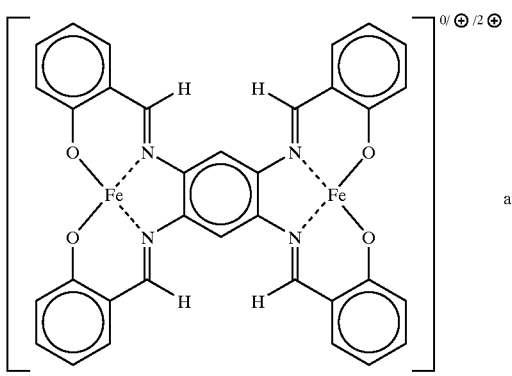

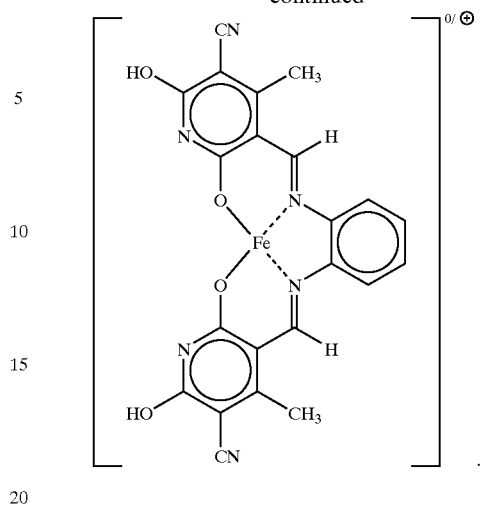

Other iron compounds that can be used, with S-containing ligands, are for instance

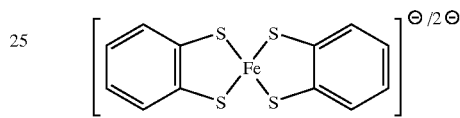

or $[Fe_4S_4(SR)_4]^{4\ominus/3\ominus}$, and also complexes of Fe(II)/Fe(III) with dithiocarbonates $R_2NCS_2^{\ominus}$ such as, for instance, $[Fe(S_2CNR_2)_3]^{\ominus}$ ($R=CH_3$, $C_2H_5$).

It is also possible to use group d) compounds. Preference is given to using, in the case of the iron halides, the Fe(II) and Fe(III) salts of Cl and Br, and also the complex compounds $FeX_4^{\ominus/2\ominus}$ (X=Cl, Br). The iron pseudohalide compounds for use in accordance with the inventon include, for example, $[Fe(CN)_6]^{3\ominus}/[Fe(CN)_6]^{4\ominus}$ and also thiocyanate complexes of the series $[Fe(SCN)_{3-x}(H_2O)_{3+x}]^{x\oplus}$ (x=0, 1, 2).

Counterions of all the abovementioned negatively charged complex ions are preferably $H^{\oplus}$, $Na^{\oplus}$, $K^{\oplus}$ and ammonium ions $NH_4^{\oplus}$, and $N(CH_3)_4^{\oplus}$, in the case of the hexacyanoferrates not only $K^{\oplus}$ but also $Fe^{2\oplus}$ in the case of $[Fe(CN)_6]^{3\ominus}$ and $Fe^{3\oplus}$ in the case of $[Fe(CN)_6]^{4\ominus}$.

In the case of the abovementioned positively charged complex ions, preferred counterions used are $Cl^{\ominus}$, $Br^{\ominus}$, $I^{\ominus}$, $SO_4^{2\ominus}$, $H_3CCO_2^{\ominus}$, $CrO_4^{2\ominus}$, $BF_4^{\ominus}$ and $B(C_6H_5)_4^{\ominus}$.

Mixtures of iron compounds may be present in which the iron centers have different oxidation states.

The iron compounds may be activated by pretreatment with substances containing peroxo groups. Suitable such compounds include, for example, $H_2O_2$, Caro's acid and peroxodisulfuric acid, and also their mono- or disodium or -potassium salts, and also organic per acids, such as perbenzoic acid or substituted perbenzoic acid, and peroxo compounds, such as tert-butyl peroxide.

A further activation of the iron compounds consists in their fine grinding, which takes place with the customary equipment, may be carried out in the dry or the wet state. If desired, it is also possible to use or add common dispersants. In addition to the abovementioned substances containing peroxo groups, it is also possible for oxygen, e.g., atmospheric oxygen, to act as sole or additional activator. This is brought about by grinding in air or under a defined mixture of oxygen (air) and an inert gas, such as nitrogen, for instance.

In the case of iron compounds whose solubility in the compositions is poor, further activation may be carried out by dissolving, or only partially dissolving, them in suitable solvents in the presence or absence of the abovementioned activators, such as peroxo substances or oxygen, and then reprecipitating them by means of appropriate measures. Examples of possible such measures, in dependence on the solvent used, if appropriate, include dilution with a liquid in which the iron compound is insoluble, neutralization with an acid or alkali, cooling of the solution, freeze drying or spray drying.

In the case of iron phthalocyanine or iron tetraazaannulene it is possible, for example, by treatment with oleum, to prepare sulfonic acid derivatives which are in part dissolved or finely dispersed and are precipitated by dilution with water. The fine suspensions obtained in this way may then, after (partial) neutralization, if appropriate, be activated further with the abovementioned substances, in which case, here again, the starting compounds to be used for preparing the nitroxyl compounds may also be present.

In general, the stabilizer composition of the invention contains from 1 ppm by weight to 5% by weight, preferably from 3 ppm by weight to 0.1% by weight, in particular from 5 ppm by weight to 0.01% by weight, of iron compound B, based on the nitrogen compound A.

In one particularly preferred embodiment the stabilizer composition of the invention further comprises at least one stable nitroxyl radical (N-oxyl radical), preferably having a molecular weight of at least 150, in particular at least 300. These are stable free radicals which in general can be prepared as pure substances and may be stored without decomposition for years. They are generally derived from a secondary amine, all substituents positioned α to the amine nitrogen atom being different than hydrogen.

Suitable N-oxyls of amines are, for example, the structures

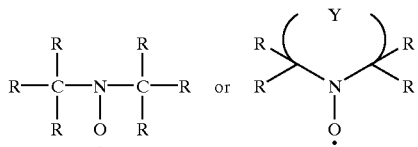

where R is identical or different alkyl, cycloalkyl, aralkyl or aryl radicals, which may also be linked in pairs to form a ring system, and Y is a group necessary to complete a 5-or 6-membered ring. For example, R is a $C_1$–$C_{20}$-, especially $C_1$–$C_8$-alkyl radical, a $C_5$- or $C_6$-cycloalkyl radical, a benzyl radical or a phenyl radical. Y is, for example, an alkylene group —(CH$_2$)$_2$— or —(CH$_2$)$_3$—.

Also suitable are N-oxyl compounds such as the following structures:

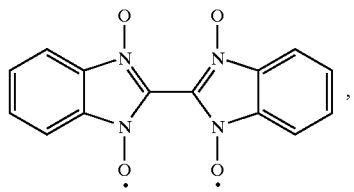

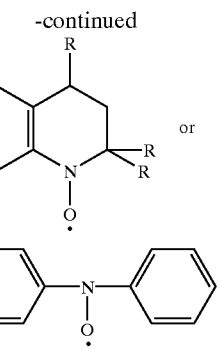

where the aromatic rings may each carry from 1 to 3 inert substituents, such as $C_1$–$C_4$-alkyl, $C_1$–$C_4$-alkoxy or cyano, for example.

Preference is given to the use of sterically hindered N-oxyls of cyclic amines, such as those of piperidine or pyrrolidine compounds, which may contain a further heteroatom in the ring, such as nitrogen, oxygen or sulfur, said heteroatom not being adjacent to the hindered amine nitrogen. The steric hindrance is provided by substituents in both positions adjacent to the amine nitrogen, suitable substituents being hydrocarbon radicals, which replace all 4 hydrogen atoms of the α—CH$_2$ groups. Examples that may be mentioned of substituents are phenyl, $C_3$–$C_6$-cycloalkyl, benzyl, and especially $C_1$–$C_6$-alkyl radicals, it also being possible for the alkyl radicals attached to the same α carbon atom to be linked with one another to form a 5- or 6-membered ring.

Preferred nitroxyl radicals have the structure

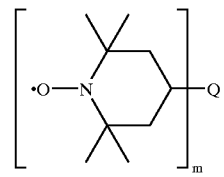

where m and Q are as already defined in connection with the nitrogen compound A.

Examples of nitroxyl radicals which may be used are
1-oxyl-2,2,6,6-tetramethylpiperidine,
1-oxyl-2,2,6,6-tetramethylpiperidin-4-ol,
1-oxyl-2,2,6,6-tetramethylpiperidin-4-one,
1-oxyl-2,2,6,6-tetramethylpiperidin-4-yl acetate,
1-oxyl-2,2,6,6-tetramethylpiperidin-4-yl 2-ethylhexanoate,
1-oxyl-2,2,6,6-tetramethylpiperidin-4-yl stearate,
1-oxyl-2,2,6,6-tetramethylpiperidin-4-yl benzoate,
1-oxyl-2,2,6,6-tetramethylpiperidin-4-yl (4-tert-butyl) benzoate,
bis(1-oxyl-2,2,6,6-tetramethylpiperidin-4-yl) succinate,
bis(1-oxyl-2,2,6,6-tetramethylpiperidin-4-yl) adipate,
bis(1-oxyl-2,2,6,6-tetramethylpiperidin-4-yl) sebacate,
bis(1-oxyl-2,2,6,6-tetramethylpiperidin-4-yl) n-butylmalonate,
bis(1-oxyl-2,2,6,6-tetramethylpiperidin-4-yl) phthalate,
bis(1-oxyl-2,2,6,6-tetramethylpiperidin-4-yl) isophthalate,
bis(1-oxyl-2,2,6,6-tetramethylpiperidin-4-yl) terephthalate,
bis(1-oxyl-2,2,6,6-tetramethylpiperidin-4-yl)-hexahydrotere-phthalate,
N,N'-bis(1-oxyl-2,2,6,6-tetramethylpiperidin-4-yl) adipamide,
N-(1-oxyl-2,2,6,6-tetramethylpiperidin-4-yl)caprolactam,
N-(1-oxyl-2,2,6,6-tetramethylpiperidin-4-yl) dodecylsuccinimide, 2,4,6-tris[N-butyl-N-(1-oxyl-2,2,6,6-tetramethylpiperidin-4-yl]-s-triazine,
N,N'-bis(1-oxyl-2,2,6,6-tetramethylpiperidin-4-yl)-N,N'-bisformyl-1,6-diaminohexane,
4,4'-ethylenebis(1-oxyl-2,2,6,6-tetramethylpiperazin-3-one), and
tris(2,2,6,6-tetramethyl-1-oxylpiperidin-4-yl) phosphite.

If used, nitroxyl radicals are used preferably in an amount of from 0.01 to 10% by weight, in particular from 0.05 to 1% by weight, based on the nitrogen compound A.

The stabilizer composition of the invention may further comprise 45 one or more costabilizers, selected preferably from a) alkylated monophenols, e.g., 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-di-cyclopentyl-4-methylphenol, 2-(α-methylcyclohexyl)-4,6-dimethylphenol, 2,6-di-octadecyl-4-methylphenol, 2,4,6-tricyclohexylphenol, 2,6-di-tert-butyl-4-methoxymethylphenol, linear or sidechain-branched nonylphenols, such as 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol, and mixtures thereof, for example;

b) alkylthiomethylphenols, e.g., 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol;

c) hydroquinones and alkylated hydroquinones, e.g. 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate;

d) tocopherols, e.g., α-tocopherol, β-tocopherol, γ-tocopherol, δ-tocopherol and mixtures thereof (vitamin E);

e) hydroxylated thiodiphenyl ethers, e.g., 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide;

f) alkylidenebisphenols, e.g., 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methyl-phenol, 1,1,3-tris(5-tert-butyl-4-hydroxy-2-methylphenyl)butane, 1,1-bis(5-tert-butyl-4-hydroxy-2-methylphenyl)-3-n-dodecyl-mercaptobutane, ethylene glycol bis[3,3-bis(3'-tert-butyl-4'-hydroxyphenyl)butyrate], bis(3,5-di-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecyl-mercaptobutane, 1,1,5,5-tetra(5-tert-butyl-4-hydroxy-2-methylphenyl)pentane;

g) O-, N- and S-benzyl compounds, e.g., 3,5,3',5'-tetra-tert-butyl-4,4'-dihydroxydibenzyl ether, octadecyl 4-hydroxy-3,5-dimethylbenzylmercaptoacetate, tridecyl 4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl) sulfide, isooctyl 3,5-di-tert-butyl-4-hydroxybenzylmercaptoacetate;

h) hydroxybenzylated malonates, e.g., dioctadecyl 2,2-bis(3,5-di-tert-butyl-2-hydroxybenzyl)malonate, dioctadecyl 2-(3-tert-butyl-4-hydroxy-5-methylbenzyl)malonate, didodecylmercaptoethyl 2,2-bis(3,5-di-tert-butyl-4-hydroxybenzyl)malonate, di[4(1,1,3,3-tetramethylbutyl)phenyl] 2,2-bis(3,5-di-tert-butyl-4-hydroxybenzyl) malonate;

i) aromatic hydroxybenzyl compounds, e.g., 1,3,5-tris(3,5-di-tert-butyl-4-hydroxybenzyl)-2,4,6-tri-methylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol;

j) triazine compounds, e.g., 2,4-bisoctylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate;

k) benzylphosphonates, e.g., dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzylphosphonate, Ca salt of 3,5-di-tert-butyl-4-hydroxybenzylphosphonic acid monoethyl ester;

l) acylaminophenols, e.g., 4-hydroxylauranilide, 4-hydroxystearanilide, octyl N-(3,5-di-tert-butyl-4-hydroxyphenyl)carbamate;

m) esters of β-(3,5-di-tert-butyl-4-ethoxyphenyl)propionic acid with monohydric or polyhydric alcohols, such as for example with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane; esters of β-(5-tert-butyl-4-hydroxy-3-methylphenyl)propionic acid with monohydric or polyhydric alcohols, such as for example with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane; esters of β-(3,5-dicyclohexyl-4-hydroxyphenyl)propionic acid with monohydric or polyhydric alcohols, such as for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane; and/or esters of 3,5-di-tert-butyl-4-hydroxyphenylacetic acid with monohydric or polyhydric alcohols, such as for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane;

n) amides of β-(3,5-di-tert-butyl-4-hydroxyphenyl) propionic acid, such as for example N,N'-bis(3,5-di-tert-butyl-4-hydroxyphenylpropionyl)hexa-methylenediamine, N,N'-bis(3,5-di-tert-butyl-4-hydroxyphenylpropionyl)tri-methylenediamine, N,N'-bis(3,5-di-tert-butyl-4-hydroxyphenylpropionyl)-hydrazine;

o) 2-(2'-hydroxyphenyl)benzotriazoles, such as for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzo-triazole, 2-(3',5'-di-tert-butyl-2'-hydroxyphenyl)-5-chlorobenzo-triazole, 2-(3'-tert-butyl-2'-hydroxy-5'-methylphenyl)-5-chloro-benzotriazole, 2-(3'-sec-butyl-5'-tert-butyl-2 1-hydroxyphenyl)benzotriazole, 2-(2'-hydroxy-4'-octoxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzo-triazole, mixture of 2-(3'-tert-butyl-2'-hydroxy-5'-(2-octyloxycarbonylethyl)-phenyl) benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl)-phenylbenzotriazole, 2,2'-methylenebis[4-(1,1,3,3-tetramethylbutyl)-6-benzo-5 triazol-2-ylphenol]; transesterification product of 2-[3'-tert-butyl-5'-(2-methoxycarbonylethyl)-2'-hydroxy-phenyl]benzotriazole with polyethylene glycol 300; [R—CH$_2$CH$_2$—COO(CH$_2$)$_3$]$_2$ where R=3'-tert-butyl-4'-hydroxy-5'-2H-benzotriazol-2-ylphenyl;

p) 2-hydroxybenzophenones, such as for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivative;

q) esters of substituted and unsubstituted benzoic acids, such as for example 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate;

r) 3-arylacrylic esters, such as for example ethyl α-cyano-β,β-diphenylacrylate, isooctyl α-cyano-β,β-diphenylacrylate, methyl α-methoxycarbonylcinnamate, methyl α-cyano-β-methyl-p-methoxycinnamate, butyl α-cyano-β-methyl-p-methoxycinnamate and methyl α-methoxycarbonyl-p-methoxycinnamate;

s) oxamides, such as for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide and also mixtures of ortho-,para-methoxy-disubstituted oxanilides and mixtures of ortho- and para-ethoxy-disubstituted oxanilides;

t) phosphites and phosphonites, such as for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecylpentaerythritol diphosphite, bis(2,4-di-tert-butylphenyl) pentaerythritol diphosphite, bis(2,6-di-tert-butyl-4-methylphenyl) pentaerythritol diphosphite, bisisodecyloxy pentaerythritol diphosphite, bis(2,4-di-tert-butyl-6-methylphenyl) pentaerythritol diphosphite, bis(2,4,6,-tri-tert-butylphenyl) pentaerythritol diphosphite, tristearyl sorbitol triphosphite, tetrakis(2,4-di-tert-butylphenyl) 4,4'-biphenylenediphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyldibenz[d,g]-1,3,2-dioxaphosphocin, bis(2,4,-di-tert-butyl-6-methylphenyl) methyl phosphite, bis(2,4-di-tert-butyl-6-methylphenyl) ethyl phosphite;

u) metal deactivators, such as for example N,N'-diphenyloxalamide, N-salicylal-N'-salicyloylhydrazine, N,N'-bis(salicylbyl)hydrazine, N,N'-bis(3,5-di-tert-butyl-4-hydroxyphenylpropionyl)-hydrazine, 3-salicyloyl-amino-1,2,4-triazole, bis(benzylidene)oxalic dihydrazide, oxanilide, isophthalic dihydrazide, sebacic bisphenyl hydrazide, N,N'-diacetyladipic dihydrazide, N,N'-bissalicyloyloxalic dihydrazide, N,N'-bissalicyloylthiopropionic dihydrazide;

v) hydroxylamines, such as for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine from hydrogenated tallow fatty amines.

The stabilizer composition of the invention is suitable for stabilizing nonliving organic material against thermal, oxidative or light-induced degradation. Nonliving organic material comprises, for example, cosmetic preparations, such as ointments and lotions, drug formulations, such as pills and suppositories, photographic recording materials, especially photographic emulsions, intermediates for plastics and coating compositions, but especially coating compositions and plastics themselves, such as synthetic polymers. Examples of materials of this kind are the following:

1. Polymers of monoolefins and diolefins, for example, polypropylene, polyisobutylene, polybut-1-ene, poly-4-methylpent-1-ene, polyisoprene or polybutadiene as well as polymers of cycloolefins such as, for instance, cyclopentene or norbornene; furthermore polyethylene (which optionally can be crosslinked), for example, high density polyethylene (HDPE), high density and high molecular mass polyethylene (HDPE-HMW), high density and ultrahigh molecular mass polyethylene (HDPE-UHMW), medium density polyethylene (MDPE), low density polyethylene (LDPE), linear low density polyethylene (LLDPE), branched low density polyethylene (VLDPE).

Polyolefins, i.e. polymers of monoolefins exemplified in the preceding paragraph, especially polyethylene and polypropylene, can be prepared by different methods, especially free-radically or by catalytic polymerization, where the catalyst normally contains one or more metals of group IVb, Vb, VIb or VIII. These catalyst systems are usually termed Phillips, Standard Oil Indiana, Ziegler (-Natta), TNZ (Dupont), metallocene or single site catalysts (SSC).

2. Mixtures of the polymers mentioned under 1., for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene-propylene copolymers, linear low density polyethylene (LLDPE) and its mixtures with low density polyethylene (LDPE), propylene-but-1-ene copolymers, propylene-isobutylene copolymers, ethylene-but-1-ene copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and their copolymers with carbon monoxide, or ethylene-acrylic acid copolymers and their salts (ionomers), as well as terpolymers of ethylene with propylene and a diene, such as hexadiene, dicyclopentadiene or ethylidenenorbornene; furthermore mixtures of such copolymers with one another and with polymers mentioned under 1., for example polypropylene/ethylene-propylene copolymers, LDPE/ethylene-vinyl acetate copolymers, LDPE/ethylene-acrylic acid copolymers, LLDPE/ethylene-vinyl acetate copolymers, LLDPE/ethylene-acrylic acid copolymers and alternating or random polyalkylene/carbon monoxide copolymers and mixtures thereof with other polymers, for example polyamides.

4. Hydrocarbon resins, including hydrogenated modifications thereof (e.g., tackifiers) and mixtures of polyalkylenes and starch.

5. Polystyrene, poly-(p-methylstyrene), poly-(α-methylstyrene).

6. Copolymers of styrene or α-methylstyrene with dienes or acrylic derivatives, for example styrene-butadiene, styrene-acrylonitrile, styrene-alkyl methacrylate, styrene-butadiene-alkyl acrylate and methacrylate, styrene-maleic anhydride, styrene-acrylonitrile methyl acrylate; mixtures of high impact strength of styrene copolymers and another polymer, for example a polyacrylate, a diene polymer or an ethylene-propylene-diene terpolymer; and block copolymers of styrene such as styrene-butadiene-styrene, styrene-isoprene-styrene, styrene-ethylene/butylene-styrene or styrene-ethylene/propylene-styrene.

7. Graft copolymers of styrene or α-methylstyrene, for example styrene on polybutadiene, styrene on polybutadiene-styrene or polybutadiene-acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleiimide on polybutadiene, styrene and alkyl acrylates or alkyl methacrylates on polybutadiene, styrene and acrylonitrile on ethylene-propylene-diene terpolymers, styrene and acrylonitrile on polyalkyl acrylates or polyalkyl methacrylates, styrene and acrylonitrile on acrylate-butadiene copolymers, as well as mixtures thereof with the copolymers mentioned under 6., for example those known as ABS, MBS, ASA or AES polymers.

8. Halogen-containing polymers, for example polychloroprene, chlorinated rubber, chlorinated and brominated copolymer of isobutylene-isoprene (halobutyl rubber), chlorinated or chlorosulfonated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride; as well as copolymers thereof, such as vinyl chloride-vinylidene chloride, vinyl chloride-vinyl acetate or vinylidene chloride-vinyl acetate.

9. Polymers derived from α,β-unsaturated acids and derivatives thereof, such as polyacrylates and polymethacrylates, and polymethyl methacrylates, polyacrylamides and polyacrylonitriles impact-modified with butyl acrylate.

10. Copolymers of the monomers mentioned under 9. with each other or with other unsaturated monomers, for example acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.

11. Polymers derived from unsaturated alcohols and amines, or the acyl derivatives or acetals thereof, such as polyvinyl alcohol, polyvinyl acetate, stearate, benzoate, maleate, polyvinylbutyral, polyallyl phthalate, polyallylmelamine; as well as their copolymers with olefins mentioned in section 1.

12. Homo- and copolymers of cyclic ethers, such as polyalkylene glycols, polyethylene oxide, polypropylene oxide or copolymers thereof with bisglycidyl ethers.

13. Polyacetals, such as polyoxymethylene, and those polyoxymethylenes which contain comonomers, for example, ethylene oxide; polyacetals modified with thermoplastic polyurethanes, acrylates or MBS.

14. Polyphenylene oxides and sulfides and mixtures thereof with styrene polymers or polyamides.

15. Polyurethanes derived from polyethers, polyesters and polybutadienes with terminal hydroxyl groups on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, such as polyamide 4, polyamide 6, polyamide 6/6, 6/10, 6/9, 6/12, 4/6, 12/12, polyamide 11, polyamide 12, aromatic polyamides starting from m-xylene, diamine and adipic acid; polyamides, prepared from hexamethylenediamine and isophthalic and/or terephthalic acid and with or without an elastomer as modifier, for example poly-2,4,4-trimethylhexamethyleneterephthalamide or poly-m-phenyleneisophthalamide. Block copolymers of the aforementioned polyamides with polyolefines, olefin copolymers, ionomers or chemically bonded or grafted elastomers; or with polyethers, for example with polyethylene glycol, polypropylene glycol or polytetramethylene glycol. Furthermore, polyamides or copolyamides modified with EPDM or ABS; and polyamides condensed during processing (RIM polyamide systems).

17. Polyureas, polyimides, polyamidimides, polyetherimides, polyesterimides, polyhydantoins and polybenzimidazoles.

18. Polyesters derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, polyhydroxybenzoates, as well as block polyether esters derived from polyethers with terminal hydroxyl groups; furthermore polyesters modified with polycarbonates or MBS.

19. Polycarbonates and polyester carbonates.
20. Polysulfones, polyether sulfones and polyether ketones.
21. Crosslinked polymers derived from aldehydes on the one hand and phenols, urea or melamine on the other, such as phenol-formaldehyde resins, urea-formaldehyde resins and melamine-formaldehyde resins.
22. Drying and nondrying alkyd resins.
23. Unsaturated polyester resins derived from copolyesters of saturated and unsaturated dicarboxylic acids with polyhydric alcohols and vinyl compounds as crosslinking agents, and also halogen-containing modifications thereof of low flammability.
24. Crosslinkable arylic resins derived from substituted acrylates, for example epoxy acrylates, urethane acrylates or polyester acrylates.
25. Alkyd resins, polyester resins and acrylate resins crosslinked with melamine resins, urea resins, isocyanates, isocyanurates, polyisocyanates or epoxy resins.
26. Crosslinked epoxy resins derived from aliphatic, cycloaliphatic, heterocyclic or aromatic glycidyl compounds, for example products of bisphenol A diglycidyl ethers, bisphenol F diglycidyl ethers, which are crosslinked by means of customary hardeners such as, for example, anhydrides or amines with or without accelerators.
27. Natural polymers such as cellulose, natural rubber, gelatin and derivatives thereof modified chemically in a polymer-homologous manner, such as cellulose acetates, cellulose propionates and cellulose butyrates, or the cellulose ethers such as methylcellulose; and also rosins and derivatives.
28. Mixtures (polyblends) of the aforementioned polymers, for example PP/EPDM, polyamide/EPDM or ABS, PVC/EVA, PVC/ABS, PVC/MBS, PC/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.
29. Natural and synthetic organic substances which constitute pure monomeric compounds or mixtures thereof, examples being mineral oils, animal or vegetable fats, oils and waxes, or oils, waxes and fats based on synthetic esters with mineral oils in any desired weight ratios, as employed, for example, as spin finishes, and also the aqueous emulsions thereof.
30. Aqueous emulsions of natural or synthetic rubbers, such as, for example, natural rubber latex or latices of carboxylated styrene-butadiene copolymers.

The stabilizer composition of the invention is particularly suitable for stabilizing synthetic polymers, preferably polyolefins and styrene homopolymers and copolymers.

The stabilizer composition of the invention is added to the organic material to be stabilized, before, during or after its production, in a concentration generally of from 0.005 to 5% by weight, preferably from 0.01 to 2% by weight, in particular from 0.05 to 1% by weight, based on said organic material.

The stabilizer composition of the invention may also be prepared in the form of a masterbatch, which comprises said composition in a concentration, for example, of from 2.5 to 25% by weight in a polymer matrix, for example, and may be added in this form to the materials which are to be stabilized.

The invention is illustrated by the following examples.

EXAMPLE 1

A stabilizer composition was prepared by mixing an alternating N-(2,2,6,6-tetramethyl-4-piperidinyl) maleiimide-$C_{20}$–$C_{24}$ α-olefin copolymer having an average molecular weight of 2500 with 0.1% of iron dibenzo[b,i]-1,4,8,11-tetraaza[14]annulene.

Polyethylene (Lupolen 1840 D) and 0.1% by weight of the stabilizer composition were mixed in an intensive mixer at 180° C. and the mixture was then homogenized in a laboratory extruder at a temperature of 180° C. and granulated. A film 70 μm thick was produced from the resulting granules in a film blowing unit. The film was weathered in accordance with DIN 53387 in an accelerated weathering instrument of the Xenotest 1200 type. Then, after 0, 504, 1008 and 1512 hours of Xenotest 1200 weathering, the extension was determined in accordance with EN ISO 527-1. The extension is a measure of the aging of the film. As the extension falls, the film loses quality. The results are summarized in Table 1.

In addition, the CO index (carbonyl index) was determined after 0, 168, 336 and 504 hours of weathering. The CO index is a measure of the concentration of carbonyl groups, which are formed by photooxidation under weathering conditions. The CO index is independent of the thickness of the test film; the IR absorbance (extinction, E) of the CO band maximum at 1715 $cm^{-1}$ (corresponding to 5.83 μm) is expressed relative to the absorbance of an aging-independent adjacent band of the polymer. For polyethylene, it is defined as follows:

$$[CO]=E5.83\ \mu m/E4.97\ \mu m$$

The results are summarized in Table 2.

EXAMPLE 2

Example 1 was repeated but using 0.01% by weight of iron compound.

The results are summarized in Tables 1 and 2.

EXAMPLE 3

Example 1 was repeated but using 1 ppm of iron compound and additionally 0.1% by weight of N,N'-bis(1-oxyl-2,2,6,6-tetramethylpiperidin-4-yl)-N,N'-bisformyl-1,6-diaminohexane (nitroxyl radical) to prepare the stabilizer composition.

The results are summarized in Tables 1 and 2.

EXAMPLE 4

Example 3 was repeated but using 5 ppm of iron compound and 0.5% by weight of nitroxyl radical.

The results are summarized in Tables 1 and 2.

EXAMPLE 5 (COMPARATIVE EXAMPLE)

Example 1 was repeated but using no iron compound.

The results are summarized in Tables 1 and 2.

EXAMPLE 6 (CONTROL)

Example 1 was repeated but using no stabilizer composition whatsoever.

The results are summarized in Tables 1 and 2.

TABLE 1

Extension of PE films after weathering

| Example No. | 0 h | 504 h | 1008 h | 1512 h |
|---|---|---|---|---|
| 1 | 368.5 | 366.8 | 257.4 | 53.0 |
| 2 | 340.6 | 343.9 | 270.3 | 36.6 |
| 3 | 364.9 | 366.2 | 308.5 | 58.4 |
| 4 | 367.1 | 355.4 | 294.5 | 66.3 |
| 5 (comparative) | 358.7 | 320.6 | 253.3 | 36.2 |
| 6 (control) | 371.4 | 320.0 | 212.1 | 24.1 |

TABLE 2

CO index of PE films after weathering

| Example No. | 0 h | 168 h | 336 h | 504 h |
|---|---|---|---|---|
| 1 | 0.265 | 0.66 | 0.68 | 1.58 |
| 2 | 0.300 | 0.70 | 0.47 | 1.47 |
| 3 | 0.333 | 0.61 | 0.57 | 1.41 |
| 4 | 0.367 | 0.73 | 0.48 | 1.39 |
| 5 (comparative) | 0.387 | 0.72 | 0.51 | 1.45 |
| 6 (control) | 0.111 | 0.82 | 0.74 | 0.94 |

We claim:

1. A Method of stabilizing nonliving organic material against the effects of light, heat or oxygen, comprising mixing 0.005% to 5% by weight, based on the organic material, a stabilizer composition comprising A) at least one nitrogen compound having a molecular weight of at toast 150, selected from a secondary amine in which all substituents positioned alpha to the amine nitrogen atom are different than hydrogen, or, derived from a secondary amine, a tertiary amine, hydroxylamine, alkoxyamine or amide; and B) 1 ppm to 5% by weight, based on the nitrogen compound, of at least one iron compound wherein said iron compound is selected from iron complexes with ligands in which the iron atom is bonded coordinatively via nitrogen, with the nonliving organic material to be stabilized against the effects of light, heat or oxygen.

2. The method according to claim 1, wherein

A) is at least one nitrogen compound of the formula

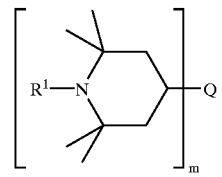

where $R^1$ is H, $C_1$–$C_8$-alkyl, $CH_2CN$, OH, $C_1$–$C_8$-alkoxy, $C_3$–$C_6$-alkenyl or $C_1$–$C_8$-acyl;

m is an integer from 1 to 100; and

Q is selected from

—O($C_1$–$C_4$-alkyl),

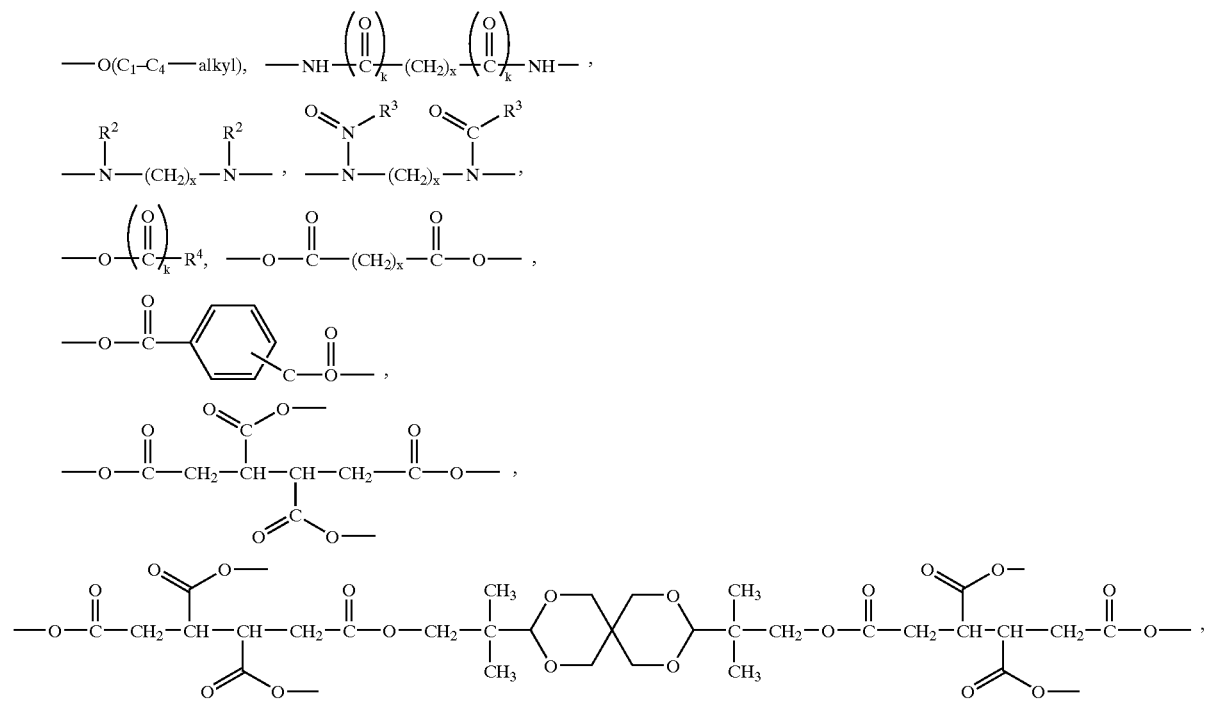

-continued

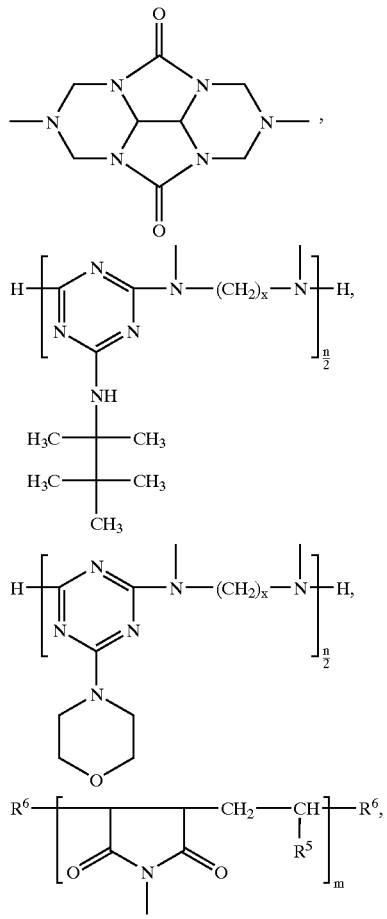

where $R^2$ is $C_1$–$C_{12}$-alkyl or —$(CH_2)_z$—$COOR^7$ $R^3$ is hydrogen or $C_1$–$C_{18}$-alkyl, $R^4$ is $C_1$–$C_{18}$-alkyl, vinyl, isopropenyl or phenyl, which may carry one, two or three substituents selected from $C_1$–$C_4$-alkyl, $R^5$ is $C_8$–$C_{22}$-alkyl, $R^6$ is hydrogen or the residue of a free-radical polymerization initiator, $R^7$ is $C_1$–$C_{18}$-alkyl, k is 0 or 1, x and z independently of one another are from 1 to 12, and n is an even number m.

3. The method according to claim 1, wherein said organic material comprises at least one member selected from the group consisting of a synthetic polymer, a polyolefin, a homopolymer of styrene, and a copolymer of styrene.

4. The method according to claim 1, further comprising at least one stable nitroxyl radical.

5. The method according to claim 1, containing from 0.01 to 10% by weight of nitroxyl radical, based on said nitrogen compound.

* * * * *